July 11, 1950   LE GRAND DALY   2,514,597
METHOD OF MAKING ARTICLES FROM PLASTIC MATERIALS
Filed July 30, 1946

INVENTOR.
LeGrand Daly.
BY
Gregory S. Dolgoruko
ATTORNEY.

Patented July 11, 1950

2,514,597

UNITED STATES PATENT OFFICE 2,514,597

METHOD OF MAKING ARTICLES FROM PLASTIC MATERIALS

Le Grand Daly, Birmingham, Mich.

Application July 30, 1946, Serial No. 687,184

3 Claims. (Cl. 18—56)

This invention relates to methods of making various articles from plastic materials as well as from fabrics bonded with such materials.

One of the objects of the invention is to provide an improved method of making articles from plastic materials as well as from various fabrics bonded with plastic materials.

Another object of the invention is to provide an improved method of making articles from plastic impregnated fabric, particularly hollow articles of such shapes that withdrawal of the mold cores is difficult or impossible without sectionalizing the same, or without destructively breaking them to pieces before withdrawal.

A further object of the invention is to provide an improved method of making articles from plastic materials or from plastic bonded fabrics, whereby dimensional tolerances may be held within relatively close limits.

A still further object of the invention is to provide an improved method of the foregoing character which is simple and requires little equipment the cost of which is moderate.

Other objects of this invention will appear in the following description and appended claims, reference being had to the accompanying drawings forming a part of this specification, wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
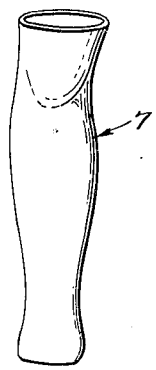
Fig. 1 shows a shell for an artificial leg, made of plastic impregnated fabric by the method embodying the present invention.
Figure 2:
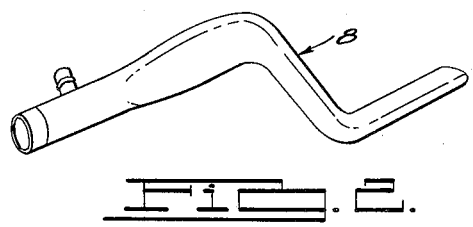
Fig. 2 shows a heating duct for an airplane, another type of article made in accordance with my improved method.
Figure 3:
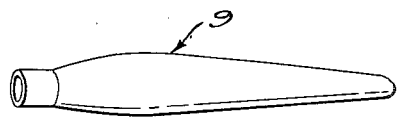
Fig. 3 illustrates a further example of an article made in accordance with my improved method, said article being a blade of an airplane propeller.

In the drawing Figs. 1, 2 and 3 show examples of articles made in accordance with my improved method. As can be clearly seen from an examination of said figures, the articles are of such shapes that if molds with permanent cores are employed for their manufacture, such core must be made in sections and withdrawn part by part. In addition, complicated shapes of some articles, such for instance as of the heating duct shown in Fig. 2, having several turns, may make such sectionalized cores so complicated in construction and so difficult and slow to withdraw as to make their use entirely impractical.

My improved method is hereinafter described with reference to making the artificial leg shell 7 shown in Fig. 1, it being understood that the duct 8 and the propeller blade 9 as well as other articles of this character can be made with the aid of the same method with only routine variations determined by such considerations as the size or the shape of the article.

Figure 4:
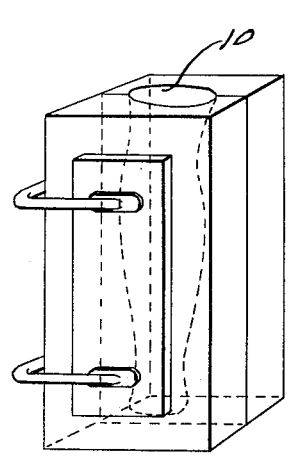
Fig. 4 is a perspective view illustrating a mold for making metal cores used in making the artificial leg shell such as shown in Fig. 1.
Figures 5, 6:
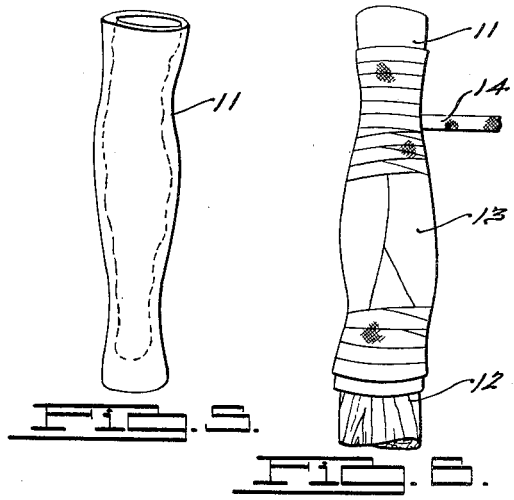
Fig. 5 shows a hollow metal form made in the mold of Fig. 4.
Fig. 6 shows the metal form of Fig. 5 being wrapped with plastic impregnated cloth.

In accordance with my improved method, a core of low melting point metal is first prepared corresponding to the interior cavity of the article to be produced. Such core may be prepared in any suitable manner. I prefer to prepare first a wooden or other pattern for the desired core, and casting around the core in a separable mold of any suitable material such as plaster of Paris, aluminum or the like. The pattern is withdrawn from the mold by separating said mold, and the mold sections are connected together such as by clamps or in any other suitable manner. Thus a mold, such as shown in Fig. 4 and having a cavity 10 corresponding to the interior of the article to be produced, in the present instance the shell 7 for the artificial leg shown in Fig. 1, is produced. I prefer to have the lower end of the mold cavity closed.

Thereupon a low melting point metal is poured into the cavity 10. The metal is allowed to stay in the mold for a very short time, enough to solidify only where it is in contact with the walls of the mold. The mold is then tipped over and the remainder of the metal, still liquid, is poured out. The mold is then separated and the hollow casting 11 removed. By making the casting hollow, its weight is greatly decreased and therefore its handling facilitated. It will be understood however, that with smaller articles, making cores hollow may be dispensed with, and such cores may be prepared by any suitable method, such as by die casting.

The hollow metal core is then secured in a steady convenient position, such as by putting it on a wooden block 12 provided on a work bench (not shown), and pieces of plastic impregnated cloth are wrapped or applied to it. Said pieces such as shown at 13 may be of predetermined shapes to cover the core without making folds, or in the form of ribbons such as 14 of suitable length, or both. The impregnated cloth is built-up in layers to produce desired thickness of the walls as required by the distribution of the expected stresses in the article in its operation, or as required by other consideration. In the present instance the shell is made with walls thicker at its knee and angle portions to increase its strength thereat and to provide sufficient bearing area for metal fittings to be connected to said portions as well as for their rivets. Metal reinforcements or inserts may be put into the wrapping in any desired manner, if required.

The wrapped core is then transferred into a curing furnace and cured therein for the time necessary to cure the plastic but at a temperature insufficient to melt the metal of the core. After the plastic is cured, the form is removed from the oven and is placed in a medium to melt the metal at the core, and let it run out leaving the shell ready for trimming and intended use.

It will now be seen in view of the foregoing that selection of metal for the core, of plastic material, and of the medium and temperature to melt the core after curing the plastic, are inter-related. I prefer to use as a metal for the cores an alloy composed of 55.5% of bismuth and 44.5% of lead, which alloy melts at 250° F. I use common duck cloth impregnated with one of many synthetic resins or thermosetting plastics curable at temperatures between 180° F.–250° F. depending on duration of the curing. With such materials, use of an oil bath heated to approximately 300° F. is very advantageous for melting the metal cores out. The cured form is simply thrown into a hot oil bath and as soon as the metal is melted out, the article rises and floats on the surface of the bath and is removed, while the metal collects at the bottom of the oil bath and may be poured directly from the bath into the mold through a suitable plug. It should be understood that after the plastic material is cured, it is not affected by higher temperatures sufficient to melt the core out. The temperature used for melting the core out should not affect the fabric or the metal inserts if any.

The choice of suitable materials is very wide. For instance, with resins curable at relatively low temperatures, cores may be made of wax and melted out in hot water. It will be understood that various modifications of my improved method may be made on the basis of the present disclosure by those skilled in the art. For instance, curing of the wrapped form may be effected in a metal mold which at the same time will impart to the article various fine surface details or precise dimensions. However, it should be understood that even with oven curing of wrapped core there is no difficulty in keeping dimensional tolerances to such relatively close limits as plus or minus .030 of an inch. Instead of wrapping the core, the same may be simply dipped into a liquid plastic, and cured with or without addition of cloth or inserts. This modification may be useful for making large hollow plastic articles of such shapes as to make permanent molds of injection or other types prohibitive in cost, particularly for limited quantities of production.

Also, instead of making a core corresponding to the interior of the article to be produced, a shell of low melting point metal may be made for its exterior, and the article pre-form assembled or the plastic material applied to the interior walls of such a shell. The remaining steps of the method will be substantially as explained above.

I claim:

1. A method of making a hollow article from plastic impregnated fabric, the steps of providing a hollow metal core corresponding to the hollow of the article to be made, the metal of said core having melting temperature higher than the curing temperature of the plastic but lower than the lowest temperature affecting the cured article, applying to said metal core plastic impregnated fabric to form the article, subjecting the entire assembly to plastic-curing heat to cure the article on the core, and thereupon placing the cured assembly into a bath of the liquid which is at a temperature sufficient to melt out the core but not high enough to affect the cured article, the liquid having specific gravity to ensure floating of the article after the core thereof is melted out.

2. A method of making hollow articles from plastic impregnated fabric, the steps of casting hollow metal cores having outside shapes corresponding to the hollows of the articles, the metal of said cores having melting temperature higher than the curing temperature of the plastic but lower than the lowest temperature affecting cured articles, applying to said metal cores pieces of plastic impregnated fabric to form the articles, subjecting the entire assemblies to the plastic curing heat to cure said assemblies on their cores, continuously placing cured articles on cores into a hot oil bath having a temperature sufficient to melt the cores out but not to affect the cured articles and specific gravity to cause the articles to rise to the surface after the cores melt, and removing the articles from the top of oil bath as they float, thus effecting a continuous process.

3. The method as defined by the preceding claim 2, said method including draining the molten metal collecting at the bottom of the oil bath and pouring it without reheating into the molds to cast said cores.

LE GRAND DALY.

REFERENCES CITED

The following references are of record in the file of this patent:

UNITED STATES PATENTS

| Number | Name | Date |
| --- | --- | --- |
| 935,254 | Gleason | Sept. 28, 1909 |
| 1,604,274 | Gammeter | Oct. 26, 1926 |
| 1,656,312 | Black | Jan. 17, 1928 |
| 2,345,977 | Howald et al. | Apr. 4, 1944 |

FOREIGN PATENTS

| Number | Country | Date |
| --- | --- | --- |
| 293,535 | Great Britain | July 12, 1928 |